(12) United States Patent
Farooqi et al.

(10) Patent No.: US 7,912,930 B1
(45) Date of Patent: Mar. 22, 2011

(54) SYSTEM AND METHOD FOR RESOURCE PROVISIONING

(75) Inventors: Babar A. Farooqi, Basking Ridge, NJ (US); Nishant Kaushik, Jersey City, NJ (US); Svetlana Kats, Brooklyn, NY (US)

(73) Assignee: Oracle International Corporation, Redwood Shores, CA (US)

( * ) Notice: Subject to any disclaimer, the term of this patent is extended or adjusted under 35 U.S.C. 154(b) by 1082 days.

(21) Appl. No.: 10/371,524

(22) Filed: Feb. 21, 2003

Related U.S. Application Data

(60) Provisional application No. 60/359,120, filed on Feb. 21, 2002.

(51) Int. Cl.
G06F 15/177 (2006.01)

(52) U.S. Cl. ........ 709/223; 709/220; 709/221; 709/222; 709/224; 705/53; 705/7; 705/8; 705/9; 705/32; 718/104

(58) Field of Classification Search .......... 709/220–224, 709/226; 705/53, 7, 8, 9, 32; 379/15.03; 718/104
See application file for complete search history.

(56) References Cited

U.S. PATENT DOCUMENTS

| | | | | |
|---|---|---|---|---|
| 5,465,354 A | * | 11/1995 | Hirosawa et al. | 718/106 |
| 5,925,102 A | * | 7/1999 | Eilert et al. | 709/226 |
| 5,944,778 A | * | 8/1999 | Takeuchi et al. | 718/100 |
| 6,871,232 B2 | * | 3/2005 | Curie et al. | 709/225 |
| 6,968,355 B2 | * | 11/2005 | Baldwin et al. | 709/201 |
| 6,973,653 B1 | * | 12/2005 | Fairman et al. | 718/104 |
| 7,116,635 B2 | * | 10/2006 | Nakano et al. | 370/230 |
| 7,152,094 B1 | * | 12/2006 | Jannu et al. | 709/206 |
| 7,159,007 B2 | * | 1/2007 | Stawikowski | 709/202 |
| 2002/0065864 A1 | * | 5/2002 | Hartsell et al. | 709/100 |
| 2002/0156904 A1 | * | 10/2002 | Gullotta et al. | 709/229 |
| 2002/0194045 A1 | * | 12/2002 | Shay et al. | 705/8 |
| 2002/0194083 A1 | * | 12/2002 | Balabhadrapatruni et al. | 705/26 |
| 2002/0199182 A1 | * | 12/2002 | Whitehead | 725/1 |
| 2003/0021228 A1 | * | 1/2003 | Nakano et al. | 370/229 |
| 2003/0069922 A1 | * | 4/2003 | Arunachalam | 709/203 |
| 2003/0142662 A1 | * | 7/2003 | Mahajan | 370/352 |
| 2005/0108218 A1 | * | 5/2005 | Mathur et al. | 707/3 |
| 2006/0021026 A1 | * | 1/2006 | de Bonet | 726/17 |

* cited by examiner

*Primary Examiner* — Thu Nguyen
*Assistant Examiner* — Tauqir Hussain
(74) *Attorney, Agent, or Firm* — Townsend and Townsend and Crew LLP

(57) ABSTRACT

Systems and methods for resource provisioning. Resources for which provisioning could be performed might include, for example, software, devices, directories, and/or databases. Where performance of an operation involved in provisioning requires interface with a resource, various operations might be performed to achieve such interface. The operations involved in a particular provisioning procedure could, for example, be defined by a system administrator and/or other user. Provisioning procedure execution might be monitored and/or affected. Further, such execution might be checked for compliance with one or more established business rules.

126 Claims, 7 Drawing Sheets

SYSTEM AND METHOD FOR RESOURCE PROVISIONING

This application claims the benefit of U.S. Provisional Application No. 60/359,120, filed Feb. 21, 2002, which is incorporated herein by reference.

FIELD OF INVENTION

This invention relates to systems and methods for resource management.

BACKGROUND INFORMATION

In recent years, there has been an increase in the use of various resources in the performance of, for example, business activities. For instance, it has become increasingly common for businesses to make use of resources such as software, databases, directories, devices, and the like.

With use of such resources can come the need for appropriately provisioning them. As a specific example, a new employee might need to have an account established with an operating system, an email server, and/or a CRM (Customer Relationship Management) System. Unfortunately, such provisioning can be a time consuming, expensive, and labor-intensive task.

Accordingly, there may be interest in technologies that facilitate resource provisioning.

SUMMARY OF THE INVENTION

According to embodiments of the present invention, there are provided systems and methods for resource provisioning. Resources for which provisioning could be performed might include, for example, software, devices, directories, and/or databases. In various embodiments, where performance of an operation involved in provisioning requires interface with a resource, various operations could be performed to achieve such interface.

The operations involved in a particular provisioning procedure could, for example, be defined by a system administrator and/or other user. In various embodiments, provisioning procedure execution could be monitored and/or affected. Further, in various embodiments, such execution could be checked for compliance with one or more established business rules.

DETAILED DESCRIPTION OF THE INVENTION

General Operation

According to embodiments of the present invention, there are provided systems and methods for resource provisioning. For example, the plurality of operations required to grant a user access to a particular resource could be performed. As another example, the plurality of tasks required to revoke a user's access to a particular resource could be performed.

For various embodiments, resource provisioning with respect to a certain user might occur in response to a request from an individual other than that user. Alternatively or additionally, self-service provisioning functionality could be provided whereby a user could request resource provisioning on his own behalf. Resources for which provisioning could be performed might include, for example, software, devices, directories, and/or databases.

The operations involved in a particular provisioning procedure could, for example, be defined by a system administrator or other individual. Such operations could be set to be performed automatically and/or by one or more individuals. Where performance of an operation requires interface with a resource, various operations could be performed to achieve such interface.

Functionality could, for various embodiments, be provided whereby the execution of a provisioning procedure could be monitored and/or affected. It is further noted that, for various embodiments, operations could be performed to ensure that resource provisioning was in compliance with one or more business rules. Such business rules could, for example, be defined by a system administrator and/or other user.

Provisioning operations could be employed for a multitude of purposes. For example, appropriate such provisioning operations could be employed to quickly set up new employees with respect to various resources. As another example, appropriate such provisioning operations could be employed to quickly de-associate an individual with various resources upon that individual ceasing to be an employee. As a further example, appropriate such provisioning operations could be put in place to set up self-service functionality whereby authorized users could request provisioning of particular resources with respect to themselves.

As another example, appropriate such provisioning operations could be employed to provide compliance with various corporate, governmental, and/or other rules and/or regulations. As specific examples, appropriate such provisioning operations could be employed to provide compliance with the privacy and security requirements of the Gramm-Leach-Bliley (GLB) Act of 1999, the Health Insurance Portability and Accountability Act of 1996 (HIPAA), and/or the Visa Cardholder Information Security Program (CISP) of May 2001.

Figure 1:
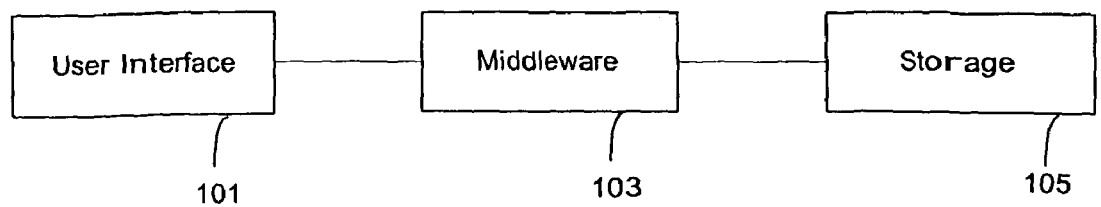
FIG. 1 shows an exemplary configuration employable in various embodiments of the present invention.

Implementation of various embodiments of the present invention might involve the use of a three-tier configuration such as that shown in FIG. 1. Shown in FIG. 1 are user interface tier 101, middleware tier 103, and storage tier 105. Store tier 105 might be implemented, for example, using one more databases such as SQL (Structured Query Language) databases.

Various aspects of the present invention will now be discussed in detail.

Provisioning Request

In various embodiments of the present invention, a managerial user and/or other user may act to request that a resource provisioned with respect to another user. The managerial user or the like could make such a request, for example, via an interface associated with user interface tier (IT) 101. The interface employed by the managerial user and/or other user might be, for example, a GUI (Graphical User Interface).

The GUI functionality might be implemented through use of a client application, such as, for instance, a Java or .Net client application. Such a client application could, for example, interface with middleware tier (MT) 103 via SOAP (Simple Object Access Protocol), RMI (Remote Method Invocation), JMS (Java Messaging Service), and/or the like. As another example, such GUI functionality might be implemented via a dynamic webpage or the like provided by and/or interfacing with MT 103. The dynamic webpage or the like could be implemented, for example, via JSP (Java Server Pages), ASP (Active Server Pages), ASP.NET, PHP (PHP: Hypertext Preprocessor), CGI (Common Gateway Interface), and/or the like. Such a dynamic webpage could be accessible through use of a conventional web browser or the like directed to an appropriate URL (uniform resource locator). Such a webpage might be accessible via the Internet, or might be accessible only via a LAN (local area network), intranet, VPN (virtual private network), or the like.

Figure 2:
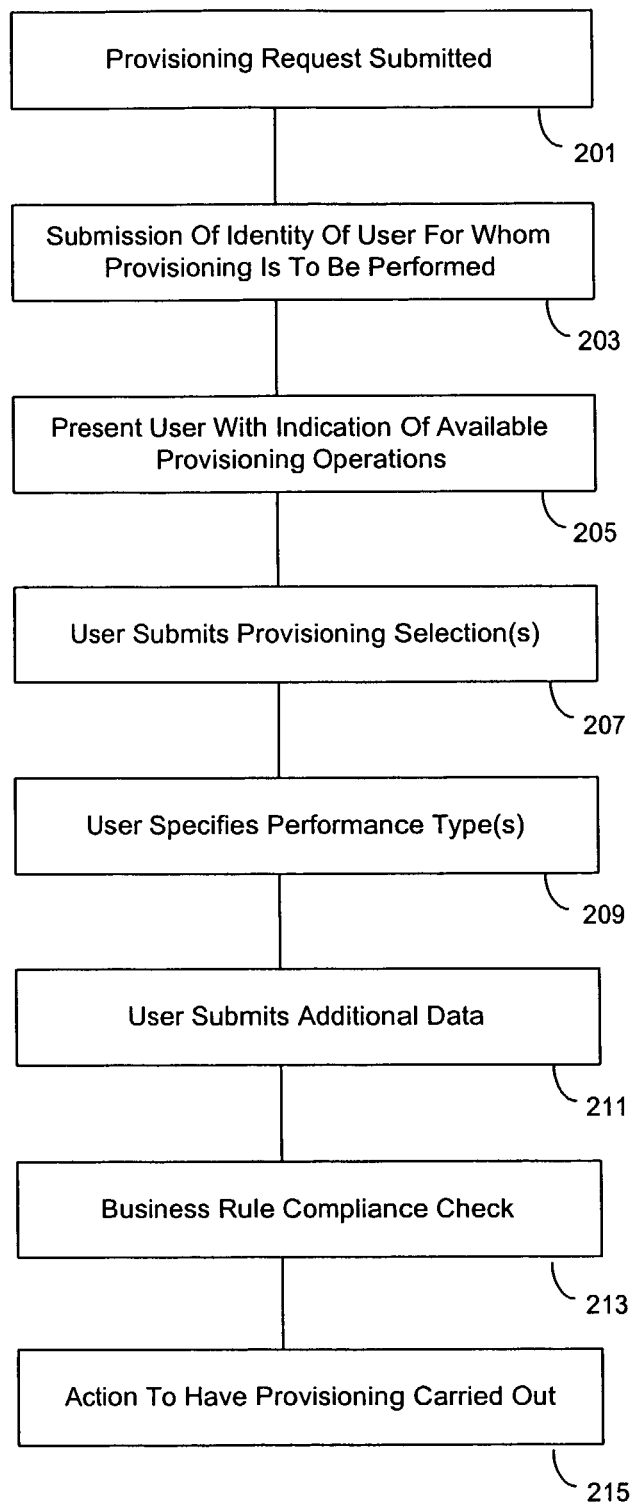
FIG. 2 is a flow chart showing exemplary steps involved in provisioning request according to various embodiments of the present invention.

With regard to FIG. 2, it is noted that a managerial user and/or other user wishing to make such a request with respect to another user might first act to specify that desire to MT 103 via a GUI or other interface associated with IT 101 (step 201). In various embodiments, the managerial user and/or other user might specify that desire by indicating to MT 103, perhaps via the GUI or other interface, a desire to create a new provisioning order. In response, MT 103 could, for example, query the managerial user and/or other user as to the user for which provisioning is requested. Such querying could be performed via the GUI or other interface.

The managerial user and/or other user might answer the query by employing the GUI or other interface to provide MT 103 with one or more identifiers associated with the user for whom provisioning is to be performed (step 203). In various embodiments, MT 103 might employ the received identifiers in consulting storage tier (ST) 105 and accessing records or the like associated with the user.

As another example, MT 103 could respond to the managerial and/or other user's request by, perhaps via the GUI or other interface, providing the managerial user and/or other user with listings or the like corresponding to users for whom provisioning could be performed, and allowing the managerial user and/or other user to select from the list the appropriate user. Upon receiving indication of the user for whom provisioning was to occur, MT 103, in various embodiments, might act to retrieve from ST 105 various records or the like corresponding to that user. It is noted that, in the case where MT 103 did not yet have knowledge of the user for whom provisioning was being requested, steps could be taken to establish that user with MT 103.

Next, MT 103 could, perhaps via the GUI or other interface, present the managerial user and/or other user with an indication of available provisioning operations (step 205). In various embodiments, established restrictions could define what provisioning operations were available for particular users and/or groups of users. Accordingly, in indicating available provisioning operations, MT 103 might present only those provisioning operations defined to be available for the selected user.

For various embodiments, available provisioning operations could be presented for selection as order items. Presented order items might include, for example, "establish Microsoft Exchange account", "establish operating system account", "establish Concurrent Versions System (CVS) account", "establish photocopier access", "establish building access", "establish CRM (Customer Relationship Management) account", "establish corporate directory access", and/or "establish corporate database access".

It noted that while certain order items might provision so as to increase a user's abilities, access to resources, and/or the like, other order items might provision so as to diminish and/or revoke a user's abilities, access to resources, and/or the like. Accordingly, presented order items might include, for example, "deactivate Microsoft Exchange account", "deactivate operating system account", "deactivate Concurrent Versions System (CVS) account", "deactivate photocopier access", "deactivate building access", "deactivate CRM (Customer Relationship Management) account", "deactivate corporate directory access", and/or "deactivate corporate database access".

As will be described in greater detail below, for various embodiments of the present invention, order items could be grouped into packages. Accordingly, such packages could be presented to the managerial user and/or other user for selection. For example, a "new employee" package could be presented including the order items "establish Microsoft Exchange account", "establish operating system account", "establish photocopier access", and "establish building access".

As will also be discussed in further detail below, associated with an order item could be one or more tasks. For example, the order item "establish Microsoft Exchange account" could be associated with the tasks "create mailbox" and "send welcome email". In various embodiments, the managerial user could be able to, perhaps via the GUI or other interface, view the tasks corresponding to a order item.

After viewing available order items and/or packages, the managerial user and/or other user could, perhaps via the GUI or other interface, act to select one or more order items, packages, and/or the like to be executed with respect to the indicated user (step 207). For various embodiments, this could involve specifying that the selected order items and/or packages be added to a provisioning order established for the indicated user. The managerial user and/or other user could, in various embodiments, act to make certain specifications with respect to one or more selected order items and/or packages, and/or corresponding tasks. Such specifications could include, for example, start date/time, due date/time, priority, and/or the like.

As will be described in greater detail below, certain tasks could be established to be for manual performance, automatic performance, or either. For tasks established to be for either manual or automatic performance, the managerial user might, perhaps depending on set restrictions, be able to specify which sort of performance be implemented (step 209). Further, for tasks to be performed manually, the managerial user might, again perhaps depending on set restrictions, be able to be able to set the user or users that should be responsible for performing the task. As will be discussed in greater detail below, one or more established restrictions could dictate the tasks assignable to a particular user. MT 103 might act to store in ST 105 various data corresponding to the managerial and/or or other user's indications.

Where additional data needed to be collected for execution of selected provisioning, MT 103 might next act request such information from the managerial user and/or other user. Such information could be solicited, for example, by presenting the managerial user and/or other user with one or more forms via the GUI or other interface. In response, the managerial user and/or other user could, perhaps via the GUI or other interface, provide the requested information (step 211). MT 103 might act to have the received information stored via ST 105.

As a next step, MT 103 could act to determine if the selected order items and/or packages, and/or received and/or stored information, were in compliance with established business rules (step 213). The business rules could, for example, be available to MT 103 via ST 105. The establishment of such business rules will be discussed below.

In the case where MT 103 found one or more established business rules to not be met, it could, perhaps via the GUI or other interface, inform the managerial user and/or other user of this fact. MT 103 might additionally offer suggested changes to achieve compliance. In response, the managerial user and/or other user could make various changes, and MT 103 could act to determine if those changes led to compliance. Alternately, the managerial user and/or other user might, perhaps via the GUI or other interface, act to cancel the provisioning request.

With compliance with any established business rules, MT 103 could act to have the provisioning corresponding to selected the order items and/or packages carried out (step 215). For corresponding tasks to be performed manually, MT 103 could act notify the responsible user or users. For example, MT 103 could act to act an appropriate entry to a maintained task list corresponding to each such user. Such task lists might, perhaps after appropriate login, be viewable by their corresponding users, for example, via a GUI or other interface of the sort noted above. For tasks to be performed automatically, MT 103 could act, as will be described in greater detail below, via adaptors associated with the tasks.

As alluded to above, various embodiments of the present invention may offer self-service provisioning functionality whereby a user may request resource provisioning on his own behalf. For such embodiments, a user wishing to be the subject of provisioning could, perhaps after performing an appropriate login, submit a request to do so to MT 103, perhaps via a GUI or other interface of the sort noted above. In various embodiments, the user might specify that desire by indicating to MT 103, perhaps via the GUI or other interface, a desire to create a new provisioning order. In response, MT 103 could, perhaps in a manner analogous to that discussed above, present the user with an indication of available provisioning operations (e.g., packages and/or order items). In a manner analogous to that discussed above, the provisioning operations presented could depend upon established restrictions set with respect to the requesting user.

In response, the user could, perhaps in a manner analogous to that discussed above, act to select one or more order items, packages, and/or the like to be executed. Further, depending on the restrictions set for the user, the user might be able to, perhaps in a manner analogous to that discussed above, make certain specifications with respect to one or more selected order items and/or packages, and/or corresponding tasks. MT 103 could then act, perhaps in a manner analogous to that discussed above, in response to the user's selections and/or specifications.

Provisioning Setup

According to various embodiments of the present invention, provisioning operations could be defined by a system administrator and/or other user. Such definition could include, for example, the definition of packages, order items, tasks, and/or the like.

Figure 3:
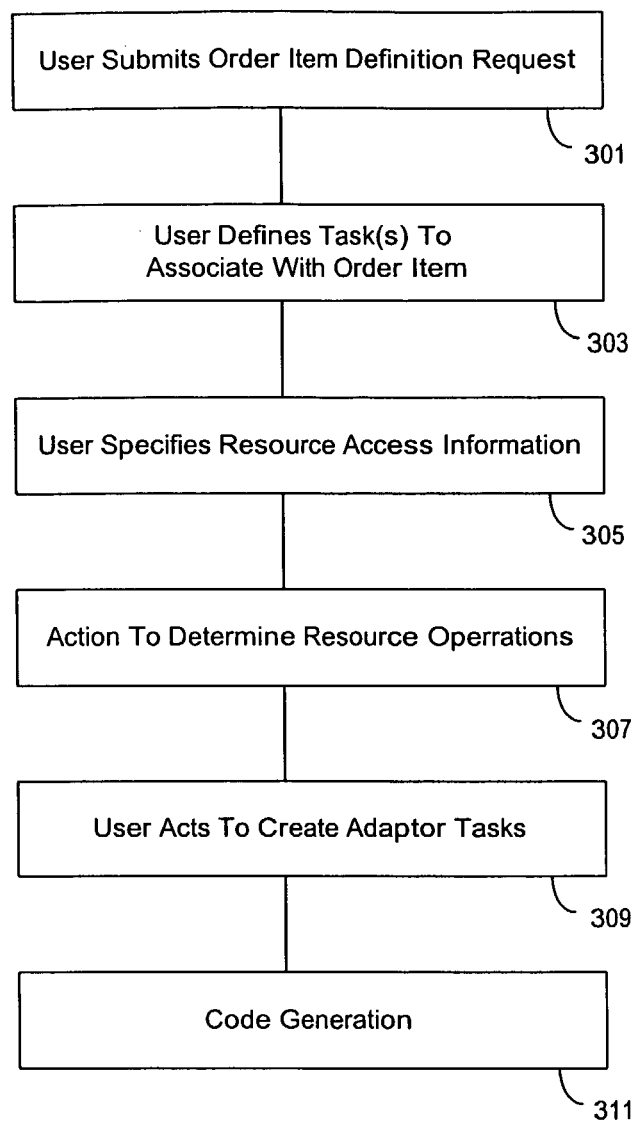
FIG. 3 is a flow chart showing exemplary steps involved in provisioning setup according to various embodiments of the present invention.

Accordingly, a system administrator and/or other user wishing to define an order item might, as indicated in step 301 of FIG. 3, submit a request to do so to MT 103 via a GUI or other interface of the sort noted above. The system administrator and/or other user might, perhaps in a similar manner, submit to MT 103 a name for the new order item. As a next step, the system administrator and/or other user might, perhaps in a similar manner, request MT 103 to associate the new order item with a new or existing package. In the case where the system administrator and/or other user indicated that the new order item is to be associated with an existing package, MT 103 might act to present the user, perhaps via a GUI or other interface of the sort noted above, with a list of existing packages.

For instance, MT 103 could act to have presented to the system administrator and/or other user a pull-down menu from which existing packages could be selected. In the case where the system administrator and/or other user indicated that the new order item was to be associated with a new package, MT 103 could act to allow the new package to be defined. Accordingly MT 103 could act to have presented to the system administrator and/or other user a GUI form where data relating to the new package could be entered. Such data could include, for example, package name. Such data might also include the indication of users, groups, and/or the like who could be the subject of provisioning performed by order items associated with the package.

As alluded to above, associated with an order item may be one or more executable tasks. Accordingly, as a next step in defining the new order item, the system administrator and/or other user may act to define tasks to associate with the order item (step 303). The system administrator and/or other user might, for example, perform such definition by communication with MT 103 via a GUI or other interface of the sort noted above. In defining a task, the system administrator and/or other user might first specify a name for the task. Next, the system administrator and/or other user might specify if the task should be performed automatically or manually. As alluded to above, a task performed automatically could be performed by MT 103, perhaps via communication with one or more resources or the like. As also alluded to above, a task performed manually could be performed by one or more users, perhaps via communication with one or more resources or the like. For various embodiments, the system administrator and/or other user might be able to specify that both performance modes be available. Where both performance modes were set to be available, a user selecting performance of the task might be able to choose the performance mode to be employed.

Further, the system administrator and/or other user could, for various embodiments, specify for the task whether completion of the task was necessary for the order item to be considered completed. Still further, the system administrator and/or other user could, for various embodiments, specify the task to be "dependent" and/or "preceding" with respect to one or more specified tasks. For example, where the task being defined was set to be dependent on another task, it could be understood that the task being defined was not to be performed until the specified other task had been successfully completed. As another example, where the task being defined was set to precede another task, it could be understood that the task being defined would have to be completed successfully before performance of the other task was to be attempted.

It is further noted that the task being defined could, in various embodiments, be set to be a "conditional" task, such that it was only to be executed if one or more specified conditions were met. For example, performance of the task could be set to be executed only upon cancellation and/or unsuccessful completion of a specified task, package, and/or order item. As a specific example, a task entitled "delete Microsoft Exchange Mailbox" might be set to be executed only upon cancellation and/or unsuccessful completion of a task entitled "create Microsoft Exchange Mailbox".

The system administrator and/or other user might, for various embodiments, be able to specify for a new task a set and/or suggested priority. In various embodiments, MT 103 could act to ensure that tasks were performed in accordance with associated priorities such that, for example, a task with a higher priority would be performed ahead of a task with a lower priority. Where the system administrator and/or other user specified a set priority, the priory associated with the task might be immutable. On the other hand, where the system administrator and/or other user specified a suggested priority, the stated priority might be overridden by the action of a user possessing appropriate credentials. As will be discussed in further detail below, such act might be performed via a monitoring and control module (MCM) associated with MT 103.

It is noted that, in various embodiments, a managerial user and/or other user could place defined tasks in structures such as, for instance, conditional structures (e.g., if-then) and/or loop structures (e.g., while-do). For instance, it could be specified that one or more specified tasks be performed within a while-do loop structure. In various embodiments, it might be possible to specify the condition of a loop with respect to one or more specified tasks.

For each task that was specified to be performable automatically, the system administrator and/or other user could communicate with MT 103, perhaps via a GUI or other interface of the sort noted above, to set up an adaptor that could be employed by MT 103 in interfacing with one or more resources for the purpose of executing the task. As a first step in setting up an adaptor, the system administrator and/or other user could specify to MT 103 information for accessing the resources to be provisioned in the corresponding task or tasks (step 305). Such information could include, for example, file path, URL (Uniform Resource Locator), network address, and/or the like.

In response, MT 103 could, as will be discussed in greater detail below, act to determine operations that could be performed with respect to each specified resource, and/or operations that could be requested from those resources (step 307). For each determined operation, MT 103 might learn of associated inputs, outputs, error codes, progress codes, and/or the like. MT 103 might act to present the determined operations and/or associated information to the system administrator via a GUI or other interface of the sort noted above.

The system administrator and/or other user might next act to create adaptor tasks that employed determined resource operations (step 309). Defined adaptor tasks could, like the tasks discussed above, be, for example, associated with conditional structures and/or loop structures, and/or could be specified to be dependent, preceding, and/or conditional. In defining an adaptor tasks, the system administrator and/or other user might act to set mapping relating to associated inputs, outputs, error codes, progress codes, and/or the like. An associated output could, for example, be mapped to be processed by another adaptor task, be mapped to a GUI or other interface element (e.g., displayed to a GUI field), be mapped to a store (e.g., written to a database field in ST 105), and/or be mapped to be processed by a specified program module.

An associated input could, for example, be mapped to receive a result and/or output of another adaptor task, be mapped to receive data from a GUI or other interface element (e.g., data entered into a GUI field), be mapped to a store (e.g., from a database field in ST 105), and/or be mapped to receive a result and/or output of a specified program module. Error and/or progress codes might be mapped in a similar manner.

As a specific example of setting up an adaptor, for a task entitled "send welcome email", a system administrator and/or other user could provide appropriate information (e.g., URLs) for MT 103 to access a stock quote web service resource and a Microsoft Exchange Server resource. MT 103 could act to determine that among the resource operations available from the web service resource was the operation "request quote". MT 103 could determine the inputs relating to this operation to be "stock ticker code", "account identifier", and "password", the outputs relating to this operation to be "requested quote", and the result code to be "success".

MT 103 could similarly determine that among the resource operations available from the Exchange Server resource was the operation "request mail to be sent". MT 103 could determine the inputs relating to this operation to be "recipient identifier", "sender identifier", "sender password", "message body", and "subject", the result code to be "success", and there to be no outputs. MT 103 could then act, perhaps via the GUI or other interface of the sort noted above, to inform the system administrator and/or other user of the determinations.

In response, the system administrator and/or other user could act to define adaptor tasks and to perform mappings of the sort noted above. Accordingly, the system administrator and/or other user could specify a first adaptor task called "get quote", and specify this adaptor task to make use of the "request quote" operation. The system administrator could map the input "stock ticker code" to receive its data via a GUI field entry, and could map the inputs "account identifier" and "password" receive their data from specified fields in ST 105. The system administrator and/or other user could further map the "requested quote" output to map to an adaptor task entitled "send quote" (discussed below), and map the result code "success" to an MCM associated with MT 103.

The system administrator and/or other user could further specify the adaptor task "send quote". The system administrator and/or other user could specify this task to make use of the "request mail to be sent" operation, and could map the input "recipient identifier" to receive its data via a GUI field entry, map the input "subject" to receive the string "stock quote", map the input "message body" to receive the "requested quote" output noted above, and map the remaining inputs associated with the "request mail to be sent" operation to specified fields in ST 105. The system administrator and/or other user could further map the result code "success" to an MCM associated with MT 103.

In various embodiments, once a system administrator and/or other user had defined adaptor aspects (e.g., adaptor tasks, mapping, and/or the like), code could be generated for performing the required actions (step 311). For instance, Java, C#/.NET, Virtual Basic, and/or other code could be generated and/or compiled, for example by MT 103, employing techniques known in the art for automatic code generation in accordance with stated specifications. Created code could be stored via ST 105, and could be executed by MT 103 in performing provisioning operations. In performing provisioning operations, MT 103 could act to respect any stated priorities of the sort noted above. Although adaptor functionality has been described above as being associated with automated tasks, it is noted that, according to various embodiments of the present invention, adaptor functionality may be employed in other ways. For example, an adaptor could be created which has an input, output, and/or error code or progress code interface with a stand alone GUI form or the like.

For each task that was specified to be performable manually, the system administrator and/or other user could communicate with MT 103, perhaps via a GUI or other interface of the sort noted above, to supply a description of the actions to performed. Upon such a task being assigned to a user, the description could be placed by MT 103 in a maintained to-do list corresponding to that user. That user might, for example, be able to view the to-do list via a GUI or other interface of the sort noted above. Further for each task that was specified to be performable manually, the system administrator and/or other user might communicate with MT 103, perhaps via a GUI or other interface of the sort noted above, to define error and/or progress codes that could be returned to MT 103 via action of a user to which a task was assigned. As will be discussed below, such a user might supply such codes, for example, via a GUI form or the like.

According to various embodiments of the present invention, a system administrator and/or other user could set up GUI forms or the like corresponding to order items, packages, tasks, adaptor tasks, and/or the like. For instance, such a GUI form could allow a user to supply inputs required for the performance of a task, adaptor task, and/or the like. As a specific example, such a GUI form could allow a user to enter the "stock ticker code" and/or "recipient identifier" values discussed above. Further, such a GUI form could allow a user to view data specified to be output in the performance of a task, adaptor task, and/or the like. Still further, such a GUI form could allow a user to specify progress and/or error codes relating to his performance of a task specified to be performable manually. As a specific example, such a user could be presented with a GUI pull-down menu from which defined error and/or progress codes of the sort noted above could be selected.

The functionality by which a system administrator and/or other user could set up such GUI forms or the like could be implemented in a number of ways. For example, the system administrator and/or other user might be able to, via a GUI or other interface of the sort noted above, be able to perform drag-and-drop and other operations to set up the interface. For various of such embodiments, code could be generated and/or compiled in a manner analogous to that discussed above. As another example, the system administrator and/or other user might be able to enter and/or import program code such as, for example, Java code.

Further according to various embodiments of the present invention, a system administrator and/or other user could, perhaps via a GUI or other interface of the sort noted above, act to define with respect to ST 105 one or more data structures to hold data relating to, resource provisioning, packages, order items, and/or the like. For example, such data structures could hold data required to perform resource provisioning, data produced by resource provisioning, error codes, progress codes, and/or the like. Alternately or additionally, such data structures could, for example, hold data entered via GUI forms of the sort discussed above.

In the definition of such a data structure, the system administrator and/or other user could, for example, define data fields to include in the structure. Such fields could, for instance, correspond to data associated with adaptor task data mapping, error and/or progress codes, and/or entry via GUI or other interface. MT 103 could, in response to receiving data structure definition information from a system administrator and/or other user, act to have appropriate corresponding structure created via ST 105 or the like. MT 103 might perform such operations, for example, by issuing appropriate SQL (Structured Query Language) commands to ST 105 or the like.

As noted above, MT 103 could act to see that provisioning was in compliance with established business rules. For various embodiments, a system administrator and/or other user could, perhaps via a GUI or other interface of the sort noted above, specify such business rules to MT 103. In various embodiments, such a specified business rule could be associated with one or more specified packages, order items, tasks, adaptor tasks, provisioning operations, and/or the like. For example, a system administrator and/or other user could specify a business rule indicating that two particular order items were mutually exclusive such that they could not be requested together for a provisioning operation. As another example, a system administrator and/or other user could specify a business rule indicating that a particular order item could not be requested for a provisioning operation unless a second particular order item was also requested.

As yet another example, a system administrator and/or other user could specify a business rule indicating that a particular order item could only be fulfilled if data collected for carrying out tasks, adaptor tasks, and/or the like associated with that order item was in accordance with specified criteria. As a specific example, a business rule might be specified stating that an order item incorporating the above-described exemplary adaptor task called "get quote" could only be fulfilled if the specified stock ticker code was one of several specified ticker codes. It is noted that the performance of provision may, as an alternative to or in addition to depending on specified business rules, depend on set rules relating to users such as, for instance, the user for which provisioning will be performed.

As discussed above, MT 103 could act to determine operations that could be performed with respect to resources, and/or operations that could be requested from resources. Such functionality could be implemented in a number of ways. For example, MT 103 could, in the case where a resource could be queried as to its corresponding operations, act to perform such a query. MT 103 might act in such a manner, for example, in embodiments where the resource has a corresponding UDDI (Universal Description, Discovery, and Integration) registry entry, can be communicated with via AppleScript, and/or is associated with one or more JavaBeans.

As another example, in the case where a resource is Java class file, JAR (Java Archive) file, library file, executable file, and/or the like, MT 103 might act to determine available operations, for instance, by parsing the file. The parsing might, for example, involve searching for commands, classes, methods, member variables, and/or the like. As yet another example, MT 103 might act to determine available operations by performing scanning operations with respect to a resource. Accordingly MT 103 might, providing appropriate credentials to the resource as necessary, provide various inputs to the resource in an attempt to determine allowable inputs and/or available operations.

For instance, MT 103 might issue commands understood by other resources, commands guessed by a system administrator, software architect, and/or other expert to be likely understood by one or more resources, and/or variants thereof to a resource and determine, based on the resource's response, which issued commands were understood by the resource. Attempted commands could be in accordance with known properties of the resource such as, for example, protocols it adhered to. MT 103 could consider issued commands which were understood to correspond to operations available with respect to the resource. Alternately or additionally MT 103 might, for instance, act in a similar manner but issue random characters, commands, and/or the like to the resource.

It is noted that, according to various embodiments of the present invention, MT 103 could allow provisioning to occur with respect to a multitude of resources via a multitude of protocols and/or the like. For instance, resources could be applications, devices, libraries, directories, databases, operating systems, and/or web services. Further communication with resources could involve, for instance, API (Application Program Interface) calls, RMI, COM (Component Object Model) calls, CORBA (Common Object Request Broker Architecture) Tibco communications, MQ Series communications, JMS, XML (eXtensible Markup Language), WSDL (Web Services Description Language), SOAP, UDDI, SQL, JDBC (Java DataBase Connectivity), LDAP (Lightweight Directory Access Protocol), AD (Active Directory), eDir, AppleScript, VBA (Visual Basic for Applications), and/or the like.

In various embodiments, a Remote Communication Manager software module could be installed at a resource to facilitate communications between MT 103 and that resource. The module could be employed, for example, to facilitate management of resources lacking their own communications protocols. The module could be implemented so as to be universally deployable, such that it could be applicable to a wide variety of resources without customization.

Communications facilitated between MT 103 and a resource by a Remote Communication Manager module could, for example, involve CORBA, RMI, JMS, SOAP, and/or the like. It is noted that, in various embodiments of the present invention, communications could be secure, encrypted, and/or the like, perhaps through the use of various techniques known in the art.

According to various embodiments of the present invention, a system administrator and/or other user could specify one or more operations to occur in response to one or more specified occurrences. Such occurrences could include, for example, a specified write via ST 105, a specified read via ST 105, and/or upon return of a specified error code and/or progress code. The system administrator and/or other user could specify such occurrences and/or operations to ST 105, for example, via a GUI or other interface of the sort noted above. In response, ST 105 might perform automatic code generation in accordance with the specifications in a manner analogous to that discussed above. It is noted that, in various embodiments, it could be specified that such specified operations operate on via a remote machine, software module, and/or the like. Such functionality could be implemented, for example, by employing SOAP, RMI, JMS, and/or the like in communications between ST 105 and the remote entity.

As alluded to above, ST 105 or the like may hold data relating to, for example, operations performed by MT 103, provisioning operations, users, stored data, and/or the like. It is noted that, in various embodiments of the present invention, export and/or import operations could be performed with respect to such data. Such export and/or input operations could, for example, allow interface with billing systems, CRM (Customer Relationship Management) systems, and/or the like. Further, such export and/or input operations could allow the transfer of established provisioning operations, packages, order items, tasks, adaptor tasks, adaptors, corresponding data, and/or the like from one implementation of the present invention to another.

Export functionality could be implemented in a number of ways. For example, MT 103 could, perhaps via a GUI or other interface of the sort noted above, allow a system administrator and/or other user to browse the data, data structure, and/or the like associated with ST 105 or the like. MT 103 might, for example, further allow the system administrator or other user to select fields, rows, columns, and/or the like to be exported. MT 103 might additionally allow the system administrator and/or other user to define a arrangement for the selected items. Such functionality could be implemented in a number of ways.

For example, MT 103 could allow the system administrator or other user to, perhaps via a GUI or other interface of the sort noted above, define an XML schema and/or the like for data export. The system administrator or other user might perform such definition, for example, by associating selected fields, rows, columns, and/or the like with structural elements (e.g., tags) of the target format. The system administrator or other user might, for example, employ the GUI or other interface in performing the association.

As another example, MT 103 could allow the system administrator or other user to, perhaps via a GUI or other interface of the sort noted above, map selected fields, rows, columns, and/or the like to a known target structure corresponding to the target export. As a specific example, the target structure might correspond to a file structure understood by a CRM or billing system. MT 103 could know of the target structure in a number of ways. For example, MT 103 could know of the target structure due to information provided by the system administrator and/or other user.

The system administrator and/or other user might provide such information, for example, via a GUI or other interface of the sort noted above. As another example, MT 103 could know of the target structure due to reading a file or the like containing a definition of the target structure. As yet another example, MT 103 could know of the target structure by analyzing a data file or the like in a format understood by the export target. In various embodiments, MT 103 could automatically perform an export operation corresponding to a particular target and/or target type, perhaps after initially receiving guidance from a system administrator and/or other user.

With regard to import operations, MT 103 could allow a system administrator and/or other user to, in a manner analogous to that discussed above, to browse the data corresponding to an import source, select data therefrom to be imported, and map it to fields, rows, columns, and/or the like associated with ST 105 or the like. MT 103 could know of the format of the import source, for instance, in a manner analogous to that discussed above.

According to various embodiments of the present invention, a system administrator and/or other user could specify one or more actions to occur at a specified time and/or at specified time intervals. Such actions could include, for example, provisioning operations, monitoring, priority and/or assignment modifications, and/or report generations. It is noted that, as alluded to above, such a provisioning operation could, for example, operate so as to increase a user's abilities, access to resources, and/or the like, and/or could operate so as to diminish and/or revoke a user's abilities, access to resources, and/or the like.

MT 103 could monitor tasks assigned for manual operation to users, and escalate them to another user and/or priority after a specified period of inactivity. Further, MT 103 could perform user setup operations, such as disabling a user on a specific date, based on set rules. Such rules could be set, for example, by a system administrator and/or other user. In various embodiments, MT 103 might perform periodic exports or imports of data. The system administrator and/or other user could schedule such occurrences and/or operations via a GUI or other interface of the sort noted above.

User Setup

As alluded to above, various embodiments of the present invention may provide for the establishment of users and/or user properties. As also alluded to above, various embodiments of the present invention may provide for the establishment of rules, restrictions, and/or the like corresponding to such users, groups, and/or the like.

Figure 4:
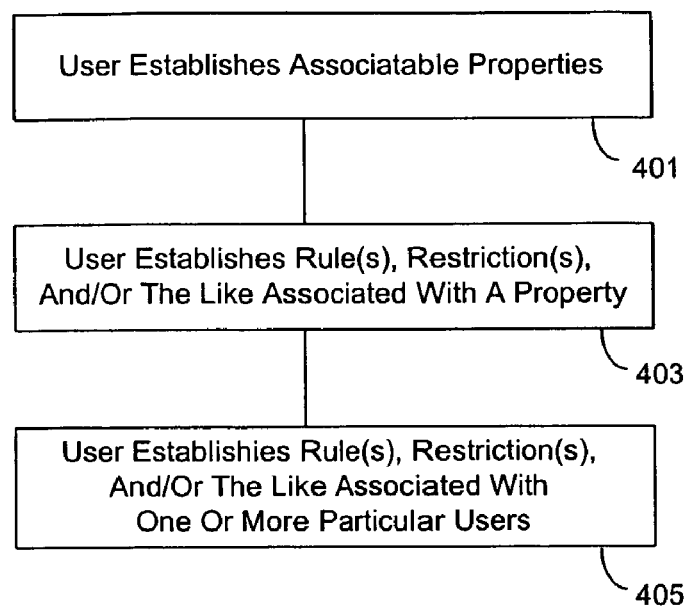
FIG. 4 is a flow chart showing exemplary steps involved in user setup according to various embodiments of the present invention.

With regard to FIG. 4, it is noted that, according to various such embodiments, a system administrator and/or other user might be able to establish one or more properties that could be associated with users (step 401). Such properties could include, for example, accounts, groups, roles, corporations, departments, classes, job descriptions, locations, and/or the like. The system administrator and/or other user could, in various embodiments, establish rules, restrictions, and/or the like with respect to such properties. For example, a rule, restriction, and/or the like could be established which applied to all users associated with a specified role (step 403). Alternately or additionally, the system administrator and/or other user could specify such rules, restrictions, and/or the like with respect to one or more particular users (step 405). The system administrator and/or other user might perform such operations, for instance, by communicating with MT 103 via a GUI or other interface of the sort noted above.

Established rules, restrictions, and/or the like might specify, for example, allowable packages and/or order items. As another example, established rules, restrictions, and/or the like might specify default and/or stipulated values relating to provisioning operations. As a specific example, a default and/or stipulated Microsoft Exchange Mailbox size could be established which applied to all users associated with a specified department. As yet another example, established rules, restrictions, and/or the like might specify which tasks, specified to be performable manually, could be assigned to users associated with a specified property.

As a further example, established rules, restrictions, and/or the like might specify operations which could be performed employing MT 103, perhaps via a GUI or other interface of the sort noted above, by users associated with a specified property. As a specific example, established rules, restrictions, and/or the like might specify that a user associated with the role "managerial user" could employ MT 103 to request order items and/or packages with respect to other users.

As another specific example, established rules, restrictions, and/or the like might specify that a user associated with the role "software architect" could employ MT 103 to request order items and/or packages with respect to himself, but not with respect to any other user. As yet another specific example, established rules, restrictions, and/or the like might specify that a user associated with the role "help desk technician" could act to view a to-do list maintained by MT 103 on his behalf, but no other to-do lists, and could employ a GUI or other interface of the sort noted above to indicate to MT 103 the progress relating to his performance of the items on his list.

As a further specific example, established rules, restrictions, and/or the like might specify that a user associated with the role "system administrator" be able to perform actions in accordance with those described above. As another specific example, established rules, restrictions, and/or the like might specify that the functionality of an order item could depend upon the user for whom it was selected. Accordingly, it could be established that the order item have one functionality when performed for a user associated with the role "telemarketer" and another functionality when performed for a user associated with the role "executive".

It is noted that, for various embodiments of the present invention, MT 103 could act to handle user logins, user actions, user accesses, and/or the like in accordance with established users and/or user properties.

Monitoring and Control

Figure 5:
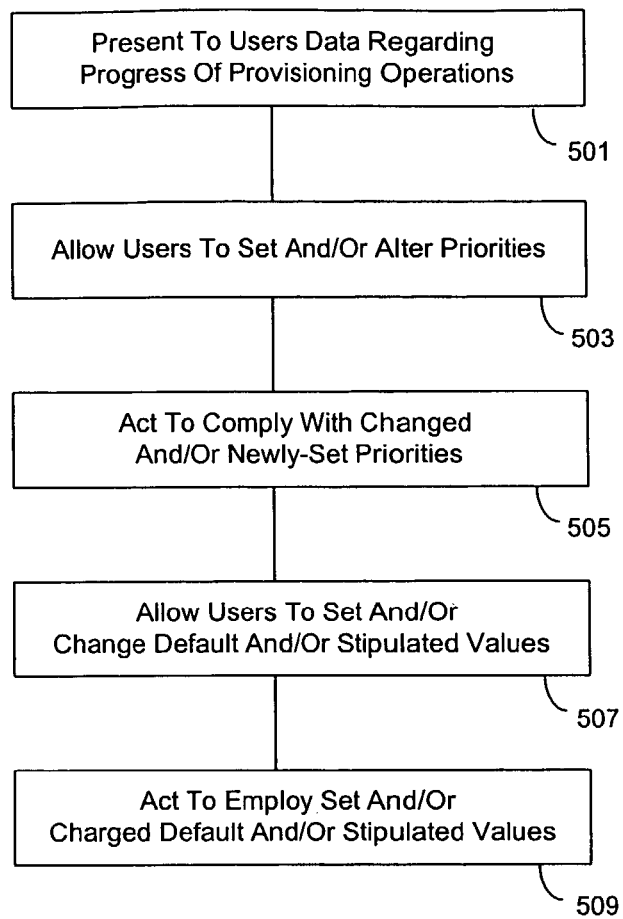
FIG. 5 is a flow chart showing exemplary steps involved in monitoring and control according to various embodiments of the present invention.

As alluded to above, associated with MT 103 could be a monitoring and control module (MCM) that received information regarding the progress of provisioning operations. For instance, as alluded to above, received by the MCM could be data regarding the performance of adaptor tasks, and/or data submitted by users regarding their performance of assigned tasks. In various embodiments, reports could be generated. As indicated in FIG. 5, according to various embodiments of the present invention, MT 103's MCM could, perhaps via a GUI or other interface of the sort noted above present to authorized users such data regarding the progress of provisioning operations (step 501).

MT 103's MCM could, in various embodiments of the present invention, allow authorized users to perform various actions with respect to the execution of provisioning operations. For example, MT 103's MCM might allow authorized users, perhaps via a GUI or other interface of the sort noted above, to set and/or alter priorities associated with provisioning operations (step 503). MT 103's MCM could, for instance, act to comply with such changed and/or newly-set priorities in the performance of automatic provisioning operations, and/or could act to inform appropriate users of changed and/or newly-set priorities for the performance of manual provisioning operations (step 505).

It is further noted that MT 103's MCM could, in various embodiments of the present invention, allow authorized users, perhaps via a GUI or other interface of the sort noted above, to set and/or change default and/or stipulated values of the sort discussed above (step 507). In response to such user action, MT 103 could act to employ set and/or changed default and/or stipulated values for instances where the default had been specified (step 509).

As yet another example, it is noted that, in various embodiments of the present invention, MT 103's MCM could allow authorized users, perhaps via a GUI or other interface of the sort noted above, to cancel provisioning operations. For instance, authorized users might be allowed to request such cancellation with respect to packages, order items, tasks, and/or adaptor tasks. MT 103 could act to comply with such user actions. It is noted that, as alluded to above, such cancellation could lead to the performance of one or more conditional tasks or the like.

Figure 6:
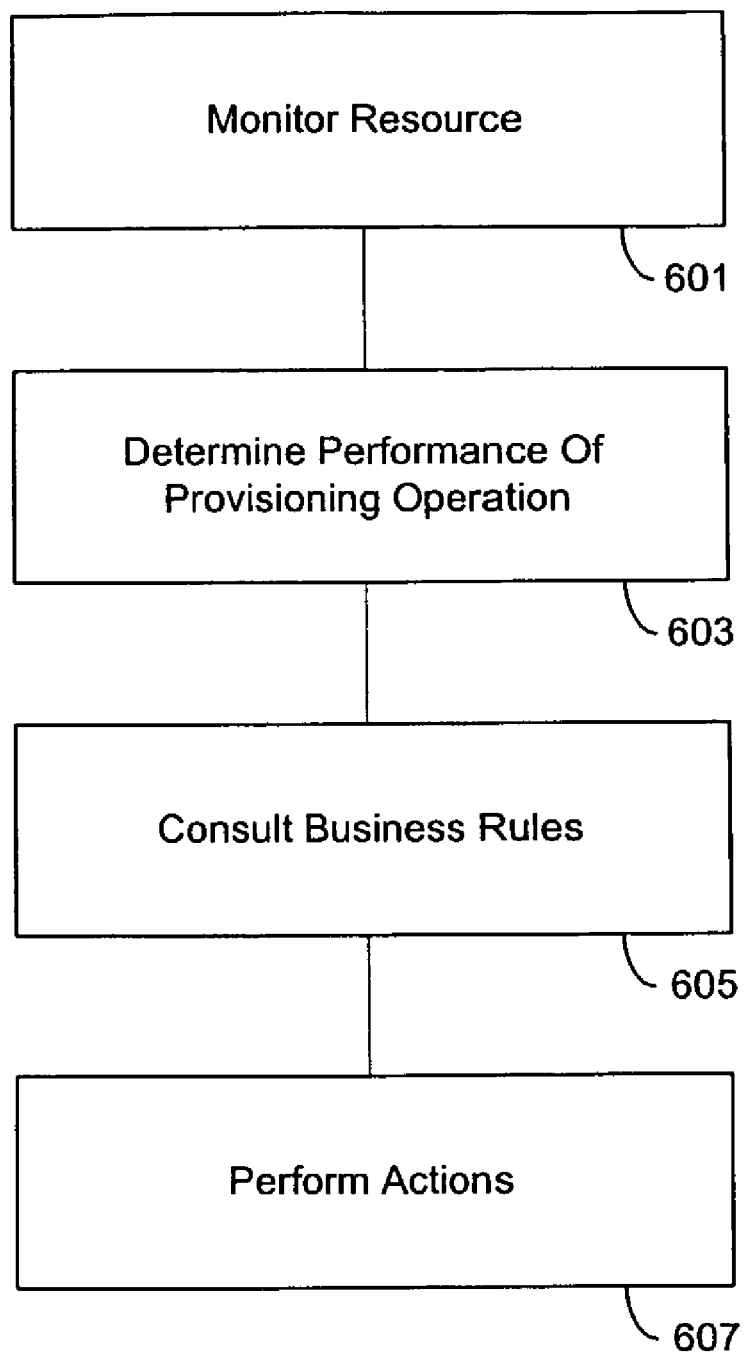
FIG. 6 is a flow chart showing exemplary steps involved in resource monitoring according to various embodiments of the present invention.

With respect to FIG. 6 it is noted that, in various embodiments of the present invention, MT 103's MCM could act to monitor resources (step 601) for provisioning operations that had taken place independently from the operation of MT 103 (step 603), and could further act to respond to such operations by facilitating the performance of one or more specified actions or the like (step 607). MT 103's MCM might, alternately or additionally, act to synchronize data between such a resource and MT 103.

The actions might, for instance, be provisioning operations, notification operations, and/or the like. It is noted that, as alluded to above, such provisioning operations could, for example, operate so as to increase a user's abilities, access to resources, and/or the like, and/or could operate so as to diminish and/or revoke a user's abilities, access to resources, and/or the like.

The actions might, for instance, be established by a system administrator and/or other user, perhaps in a manner analogous to that discussed above. In various embodiments, the actions could be established as conditional actions. It is noted that the actions might, in various embodiments, be performed in accordance with established business rules (step 605). Further, a resource could, in various embodiments, be deemed an "authoritative resource", and the data received form such a resource could be used to define, for instance, users and/or user properties.

Hardware and Software

Certain procedures and the like described herein may be executed by or with the help of computers. The phrases "computer", "general purpose computer", and the like, as used herein, refer but are not limited to a processor card smart card, a media device, a personal computer, an engineering workstation, a PC, a Macintosh, a PDA, a computerized watch, a wired or wireless terminal, a server, a network access point, a network multicast point, or the like, perhaps running an operating system such as OS X, Linux, Darwin, Windows CE, Windows XP, Palm OS, Symbian OS, or the like, perhaps with support for Java or .Net.

Figure 7:
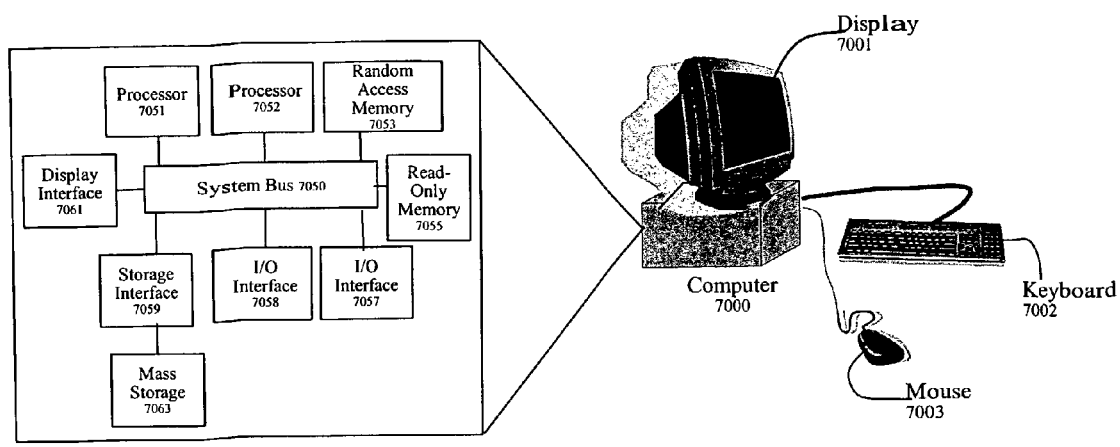
FIG. 7 shows an exemplary general purpose computer employable in embodiments of the present invention.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 7000 as shown in FIG. 7 includes system bus 7050 which operatively connects two processors 7051 and 7052, random access memory 7053, read-only memory 7055, input output (I/O) interfaces 7057 and 7058, storage interface 7059, and display interface 7061. Storage interface 7059 in turn connects to mass storage 7063. Each of I/O interfaces 7057 and 7058 may be an Ethernet, IEEE 1394, IEEE 1394b, IEEE 802.11a, IEEE 802.11b, IEEE 802.11g, IEEE 802.16a, IEEE P802.20, Bluetooth, terrestrial digital video broadcast (DVB-T), satellite digital video broadcast (DVB-S), digital audio broadcast (DAB), general packet radio service (GPRS), universal mobile telecommunications service (UMTS), or other interface known in the art.

Mass storage 7063 may be a hard drive, optical drive, or the like. Processors 7057 and 7058 may each be a commonly known processor such as an IBM or Motorola PowerPC, an AMD Athlon, an AMD Opteron, an Intel ARM, an Intel XScale, a Transmeta Crusoe, or an Intel Pentium. Computer 7000 as shown in this example also includes an display unit 7001, a keyboard 7002 and a mouse 7003. In alternate embodiments, keyboard 7002, and/or mouse 7003 might be replaced and/or augmented with a touch screen, pen, and/or keypad interface. Computer 7000 may additionally include or be attached to card readers, DVD drives, floppy disk drives, and/or the like whereby media containing program code may be inserted for the purpose of loading the code onto the computer.

In accordance with the present invention, a computer may run one or more software modules and/or employ one or more tiers designed to perform one or more of the above-described operations. Such modules could be programmed using languages such as Java, Objective C, C, C#, and/or C++ according to methods known in the art. Corresponding program code might be placed on media such as, for example, DVD, CD-ROM, and/or floppy disk. It is noted that any described division of operations among particular software modules, tiers, and/or the like is for purposes of illustration, and that alternate divisions of operation may be employed. Accordingly, operations discussed as being performed by one software module, tier, and/or the like might instead be performed by a plurality of software modules, tiers, and/or the like. Similarly, operations discussed as being performed by a plurality of modules, tiers, and/or the like might instead be performed by a single module, tier, and/or the like.

Further, although embodiments of the invention disclose certain software modules, tiers, and/or the like as operating on certain devices, in alternate embodiments these modules, tiers, and/or the like might be distributed to run on other devices than those stated. For example, operations disclosed as being performed by a particular computer might instead be performed by a plurality of computers. It is further noted that, in various embodiments, grid computing techniques may be employed.

RAMIFICATIONS AND SCOPE

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

What is claimed is:

1. A method for resource provisioning, the method comprising:

communicating, from a middleware tier provided by one or more computers, information configured for displaying a first graphical user interface to users, the first graphical user interface configured to enable the users of the first graphical user interface to define processes via the first graphical user interface to be performed by the middleware tier in provisioning resources;

receiving, at the middleware tier provided by the one or more computers, information specified by a user interacting with the first graphical user interface defining one or more processes to be performed by the middleware tier in provisioning a resource;

automatically determining, with the middleware tier provided by the one or more computers, a set of inputs or a set of outputs to operations that can be performed with respect to the resource or that can be requested from the resource;

communicating, from the middleware tier provided by the one or more computers, information configured for displaying the second graphical user interface configured to enable users of the second graphical user interface to define tasks associated with processes defined via the first graphical user interface, the second user interface presenting at least one of the set of inputs or the set of outputs to operations that can be performed with respect to the resource or that can be requested from the resource;

receiving, at the middleware tier provided by the one or more computers, task information specified by a user while interacting with the second graphical user interface, the received task information defining:

a task for a process in the one or more processes to be performed by the middleware tier in provisioning the resource, the task associated with at least one operation that can be performed with respect to the resource or that can be requested from the resource, and a mapping for the task, the mapping associating user input provided via the second graphical user interface with an operational access point of the at least one operation that can be performed with respect to the resource or that can be requested from the resource, the operational access point corresponding to at least one of an input to the at least one operation or an output from the at least one operation; and provisioning, upon selection of the package, the resource with the middleware tier provided by the one or more computers based on executing each of the one or more processes associated with the package;

wherein the middleware tier provided by the one or more computers interacts with the resource to invoke the at least one operation associated with the task with the operational access point corresponding to the at least one of an input to the at least one operation or an output from the at least one operation;

wherein the middleware tier provided by the one or more computers interacts with the resource to invoke the at least one operation associated with the task with the operational access point accessible via at least one of an application program interface call, remote method invocation, Java messaging service, a simple object access protocol, a structured query language, a web services description language, a lightweight directory access protocol, visual basic for applications, component object model operations, an object request broker architecture, and a remote communication manager communicating locally with said resource.

2. The method of claim 1, further comprising receiving, at the middleware tier provided by the one or more computers, information establishing one or more business rules.

3. The method of claim 2, further comprising determining, with the middleware tier provided by the one or more computers, compliance of said one or more processes to be performed by the middleware tier in provisioning a resource with said one or more business rules.

4. The method of claim 1, wherein provisioning, upon selection of the package, the resource with the middleware tier provided by the one or more computers based on executing each of the one or more processes comprises time-based execution of the one or more processes.

5. The method of claim 4, wherein the time-based execution of the one or more processes comprises executing the one or more processes at a scheduled time with the middleware tier provided by the one or more computers.

6. The method of claim 4, wherein the time-based execution of the one or more processes comprises executing the one or more processes with the middleware tier provided by the one or more computers in accordance with an established time interval.

7. The method of claim 1, further comprising monitoring execution of the one or more processes with the middleware tier provided by the one or more computers.

8. The method of claim 7, wherein said monitoring is time-based.

9. The method of claim 8, wherein said monitoring occurs at a scheduled time.

10. The method of claim 8, wherein said monitoring occurs in accordance with an established time interval.

11. The method of claim 1, further comprising generating, with the middleware tier provided by the one or more computers, a report corresponding to executing each of the one or more processes.

12. The method of claim 11, wherein said generating is time-based.

13. The method of claim 12, wherein said generating occurs at a scheduled time.

14. The method of claim 12, wherein said generating occurs in accordance with an established time interval.

15. The method of claim 1, further comprising:
receiving, at the middleware tier provided by the one or more computers, information indicative of a priority associated with executing each of the one or more processes; and changing, with the middleware tier provided by the one or more computers, a priority of executing each of the one or more processors in response to the information indicative of a priority.

16. The method of claim 15, wherein said changing is time-based.

17. The method of claim 16, wherein said changing occurs at a scheduled time.

18. The method of claim 16, wherein said changing occurs in accordance with an established time interval.

19. The method of claim 1, wherein said resource is software.

20. The method of claim 19, wherein said software is application software.

21. The method of claim 19, wherein said software is an operating system.

22. The method of claim 1, wherein said resource is a device.

23. The method of claim 1, wherein said resource is a directory.

24. The method of claim 1, wherein said resource is a database.

25. The method of claim 1, further comprising:
receiving, at the middleware tier provided by the one or more computers, information establishing a user property associated with users that can execute the one or more processes.

26. The method of claim 25, wherein said user property is an account.

27. The method of claim 25, wherein said user property is a group.

28. The method of claim 25, wherein said user property is a rule.

29. The method of claim 25, wherein said user property is a location.

30. The method of claim 25, wherein said user property is a corporation.

31. The method of claim 25, wherein said user property is a department.

32. The method of claim 1, further comprising:
receiving, at the middleware tier provided by the one or more computers, information establishing a user that is allowed to execute the one or more processes to be performed in provisioning the resource.

33. The method of claim 25, further comprising associating one or more policy rules with said user property.

34. The method of claim 32, further comprising associating one or more policy rules with said user.

35. The method of claim 1, wherein a request for said provisioning is submitted by a user that wishes to be provisioned for said resource.

36. The method of claim 1, wherein a request for said provisioning is submitted by other than a user that wishes to be provisioned for said resource.

37. The method of claim 1, wherein executing each of the one or more processes comprises automatic performance of the one or more of said processes with the middleware tier.

38. The method of claim 1, wherein executing each of the one or more processes comprises assigning, with the middleware tier, one or more of said processes to one or more individuals.

39. The method of claim 1, wherein communicating the first or second graphical user interfaces comprises communication one or more forms employable in entering data relating to said provisioning.

40. The method of claim 1, further comprising receiving, at the middleware tier provided by the one or more computers, information establishing one or more default values employable in said provisioning.

41. The method of claim 1, wherein said resource is a remote resource.

42. The method of claim 1, wherein said resource is a local resource.

43. A system for resource provisioning, comprising:
a memory having program code stored therein; and
a processor disposed in communication with said memory for carrying out instructions in accordance with said stored program code;
wherein said program code, when executed by said processor, causes said processor to:
receive order item information specified by a user interacting with a first graphical user interface configured to enables users to define processes via the first graphical user interface to be performed in provisioning resources, the order item information defining one or more processes to be performed in provisioning a resource and associating each of the one or more processes with a package representing an ordering of a set of processes to be performed in provisioning resources;
automatically determining a set of inputs or a set of outputs to operations that can be performed with respect to the resource or that can be requested from the resource;
receive task information specified by a user interacting with a second graphical user interface configured to enable users of the second graphical user interface to define tasks associated with processes defined via the first graphical user interface to be performed in provisioning resources based on the set of inputs or the set of outputs determined by the processor, the task information defining:
a task for a process in the one or more processes to be performed in provisioning the resource, the task associated with at least one operation that can be performed with respect to the resource or that can be requested from the resource, and
a mapping for the task, the mapping associating user input provided via the second graphical user interface with an operational access point of the at least one operation that can be performed with respect to the resource or that can be requested from the resource, the operational access point corresponding to at least one of an input to the at least one operation or an output from the at least one operation; and
execute one or more of said processes to provision said resource in response to selection of said package wherein said program code causes said processor to interact with said resource to invoke the at least one operation identified in the task with the operational access point corresponding to the at least one of an input to the at least one operation or an output from the at least one operation;
wherein said program code, when executed by said processor, causes said processor to interact with said resource to invoke the at least one operation identified in the task with the operational access point accessible via at least one of an application program interface call, remote method invocation, Java messaging service, a simple object access protocol, a structured query language, a web services description language, a lightweight directory access protocol, visual basic for applications, component object model operations, an object request broker architecture, and a remote communication manager communicating locally with said resource.

44. The system of claim 43, wherein said program code further causes said processor to receive information establishing one or more business rules.

45. The system of claim 44, wherein said program code further causes said processor to determine compliance of said one or more processes with said business rules.

46. The system of claim 43, wherein said executing is time-based.

47. The system of claim 46, wherein said executing occurs at a scheduled time.

48. The system of claim 46, wherein said executing occurs in accordance with an established time interval.

49. The system of claim 43, wherein said program code further causes said processor to monitor said executing.

50. The system of claim 49, wherein said monitoring is time-based.

51. The system of claim 50, wherein said monitoring occurs at a scheduled time.

52. The system of claim 50, wherein said monitoring occurs in accordance with an established time interval.

53. The system of claim 43, wherein said program code further causes said processor to generate a report corresponding to said executing.

54. The system of claim 53, wherein said generating is time-based.

55. The system of claim 54, wherein said generating occurs at a scheduled time.

56. The system of claim 54, wherein said generating occurs in accordance with an established time interval.

57. The system of claim 43, wherein a priority associated with said executing is changed.

58. The system of claim 57, wherein said change is time-based.

59. The system of claim 58, wherein said change occurs at a scheduled time.

60. The system of claim 58, wherein said change occurs in accordance with an established time interval.

61. The system of claim 43, wherein said resource is software.

62. The system of claim 61, wherein said software is application software.

63. The system of claim 61, wherein said software is an operating system.

64. The system of claim 43, wherein said resource is a device.

65. The system of claim 43, wherein said resource is a directory.

66. The system of claim 43, wherein said resource is a database.

67. The system of claim 43, wherein said program code further causes said processor to receive information establishing a user property.

68. The system of claim 67, wherein said user property is an account.

69. The system of claim 67, wherein said user property is a group.

70. The system of claim 67, wherein said user property is a rule.

71. The system of claim 67, wherein said user property is a location.

72. The system of claim 67, wherein said user property is a corporation.

73. The system of claim 67, wherein said user property is a department.

74. The system of claim 43, wherein said program code further causes said processor to receive information establishing a user.

75. The system of claim 67, wherein said program code further causes said processor to receive information associating one or more policy rules with said user property.

76. The system of claim 74, wherein said program code further causes said processor to receive information associating one or more policy rules with said user.

77. The system of claim 43, wherein a request for said provisioning is submitted by a user that wishes to be provisioned said resource.

78. The system of claim 43, wherein a request for said provisioning is submitted by other than a user that wishes to be provisioned said resource.

79. The system of claim 43, wherein said executing comprises automatic performance of said one or more of processes.

80. The system of claim 43, wherein said executing comprises assigning said one or more of processes to one or more individuals.

81. The system of claim 43, wherein said program code further causes said processor to create one or more forms employable in entering data relating to said provisioning.

82. The system of claim 43, wherein said program code further causes said processor to receive information establishing one or more default values employable in said provisioning.

83. The system of claim 43, wherein said resource is a remote resource.

84. The system of claim 43, wherein said resource is a local resource.

85. A non-transitory computer-readable medium storing computer-executable code for resource provisioning, the non-transitory computer-readable medium comprising:
 code for communicating information configured for displaying a first graphical user interface to users, the first graphical user interface configured to enable the users of the first graphical user interface to define processes via the first graphical user interface to be performed by a middleware tier in provisioning resources;
 code for receiving information specified by a user interacting with the first graphical user interface defining one or more processes to be performed by the middleware tier in provisioning a resource;
 code for automatically determining a set of inputs or a set of outputs to operations that can be performed with respect to the resource or that can be requested from the resource;
 code for communicating information configured for displaying the second graphical user interface configured to enable users of the second graphical user interface to define tasks associated with processes defined via the first graphical user interface, the second user interface presenting at least one of the set of inputs or the set of outputs to operations that can be performed with respect to the resource or that can be requested from the resource;
 code for receiving task information specified by a user while interacting with the second graphical user interface, the received task information defining:
  a task for a process in the one or more processes to be performed by the middleware tier in provisioning the resource, the task associated with at least one operation that can be performed with respect to the resource or that can be requested from the resource, and
  a mapping for the task, the mapping associating user input provided via the second graphical user interface with an operational access point of the at least one operation that can be performed with respect to the resource or that can be requested from the resource, the operational access point corresponding to at least one of an input to the at least one operation or an output from the at least one operation; and
 code for provisioning, upon selection of the package, the resource with the middleware tier based on executing each of the one or more processes associated with the package;
 wherein the middleware tier interacts with the resource to invoke the at least one operation associated with the task with the operational access point corresponding to the at least one of an input to the at least one operation or an output from the at least one operation;
 wherein the middleware tier interacts with the resource to invoke the at least one operation associated with the task with the operational access point accessible via at least one of an application program interface call, remote method invocation, Java messaging service, a simple object access protocol, a structured query language, a web services description language, a lightweight directory access protocol, visual basic for applications, component object model operations, an object request broker architecture, and a remote communication manager communicating locally with said resource.

86. The non-transitory computer-readable medium of claim 85, further comprising code for receiving information establishing one or more business rules.

87. The non-transitory computer-readable medium of claim 86, further comprising code for determining compliance of said one or more processes to be performed by the middleware tier in provisioning a resource with said one or more business rules.

88. The non-transitory computer-readable medium of claim 85, wherein the code for provisioning, upon selection of the package, the resource with the middleware tier based on executing each of the one or more processes comprises code for time-based execution of the one or more processes.

89. The non-transitory computer-readable medium of claim 88, wherein the code for time-based execution of the one or more processes comprises code for executing the one or more processes at a scheduled time with the middleware tier.

90. The non-transitory computer-readable medium of claim 88, wherein the code for time-based execution of the one or more processes comprises code for executing the one or more processes with the middleware tier in accordance with an established time interval.

91. The non-transitory computer-readable medium of claim 85, further comprising code for monitoring execution of the one or more processes with the middleware tier.

92. The non-transitory computer-readable medium of claim 91, wherein said monitoring is time-based.

93. The non-transitory computer-readable medium of claim 91, wherein said monitoring occurs at a scheduled time.

94. The non-transitory computer-readable medium of claim 91, wherein said monitoring occurs in accordance with an established time interval.

95. The non-transitory computer-readable medium of claim 85, further comprising code for generating a report corresponding to executing each of the one or more processes.

96. The non-transitory computer-readable medium of claim 95, wherein said generating is time-based.

97. The non-transitory computer-readable medium of claim 95, wherein said generating occurs at a scheduled time.

98. The non-transitory computer-readable medium of claim 95, wherein said generating occurs in accordance with an established time interval.

99. The non-transitory computer-readable medium of claim 85, further comprising:
code for receiving information indicative of a priority associated with executing each of the one or more processes; and
code for changing a priority of executing each of the one or more processors in response to the information indicative of a priority.

100. The non-transitory computer-readable medium of claim 99, wherein said changing is time-based.

101. The non-transitory computer-readable medium of claim 99, wherein said changing occurs at a scheduled time.

102. The non-transitory computer-readable medium of claim 99, wherein said changing occurs in accordance with an established time interval.

103. The non-transitory computer-readable medium of claim 85, wherein said resource is software.

104. The non-transitory computer-readable medium of claim 103, wherein said software is application software.

105. The non-transitory computer-readable medium of claim 103, wherein said software is an operating system.

106. The non-transitory computer-readable medium of claim 85, wherein said resource is a device.

107. The non-transitory computer-readable medium of claim 85, wherein said resource is a directory.

108. The non-transitory computer-readable medium of claim 85, wherein said resource is a database.

109. The non-transitory computer-readable medium of claim 85, further comprising:
code for receiving information establishing a user property associated with users that can execute the one or more processes.

110. The non-transitory computer-readable medium of claim 109, wherein said user property is an account.

111. The non-transitory computer-readable medium of claim 109, wherein said user property is a group.

112. The non-transitory computer-readable medium of claim 109, wherein said user property is a rule.

113. The non-transitory computer-readable medium of claim 109, wherein said user property is a location.

114. The non-transitory computer-readable medium of claim 109, wherein said user property is a corporation.

115. The non-transitory computer-readable medium of claim 109, wherein said user property is a department.

116. The non-transitory computer-readable medium of claim 85, further comprising:
code for receiving information establishing a user that is allowed to execute the one or more processes to be performed in provisioning the resource.

117. The non-transitory computer-readable medium of claim 109, further comprising associating one or more policy rules with said user property.

118. The non-transitory computer-readable medium of claim 117, further comprising associating one or more policy rules with said user.

119. The non-transitory computer-readable medium of claim 85, wherein a request for said provisioning is submitted by a user that wishes to be provisioned for said resource.

120. The non-transitory computer-readable medium of claim 85, wherein a request for said provisioning is submitted by other than a user that wishes to be provisioned for said resource.

121. The non-transitory computer-readable medium of claim 85, wherein the code for executing each of the one or more processes comprises code for automatic performance of the one or more of said processes with the middleware tier.

122. The non-transitory computer-readable medium of claim 85, wherein the code for executing each of the one or more processes comprises code for assigning one or more of said processes to one or more individuals.

123. The non-transitory computer-readable medium of claim 85, wherein the code for communicating the first or second graphical user interfaces comprises code for communication one or more forms employable in entering data relating to said provisioning.

124. The non-transitory computer-readable medium of claim 85, further comprising code for receiving information establishing one or more default values employable in said provisioning.

125. The non-transitory computer-readable medium of claim 85, wherein said resource is a remote resource.

126. The non-transitory computer-readable medium of claim 85, wherein said resource is a local resource.

* * * * *

UNITED STATES PATENT AND TRADEMARK OFFICE
CERTIFICATE OF CORRECTION

PATENT NO.         : 7,912,930 B1
APPLICATION NO.    : 10/371524
DATED              : March 22, 2011
INVENTOR(S)        : Farooqi et al.

Page 1 of 1

It is certified that error appears in the above-identified patent and that said Letters Patent is hereby corrected as shown below:

In the Drawings

On sheet 3 of 7, in figure 3, in Box No. 307, line 1, delete "Operrations" and insert -- Operations --, therefor.

On sheet 4 of 7, in figure 4, in Box No. 405, line 1, delete "Establishies" and insert -- Establishes --, therefor.

Signed and Sealed this
Fourth Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,912,930 B1 | Page 1 of 1 |
| APPLICATION NO. | : 10/371524 | |
| DATED | : March 22, 2011 | |
| INVENTOR(S) | : Farooqi et al. | |

It is certified that error appears in the above-identified patent and that said Letters Patent is hereby corrected as shown below:

In column 17, claim 1, line 17, delete "and" and insert -- or --.

In column 20, claim 43, line 3, delete "and" and insert -- or --.

In column 22, claim 85, line 29, delete "and" and insert -- or --.

Signed and Sealed this
Sixth Day of March, 2012

David J. Kappos
*Director of the United States Patent and Trademark Office*